(12) United States Patent
Roby

(10) Patent No.: US 7,217,204 B2
(45) Date of Patent: May 15, 2007

(54) CONTINUOUSLY VARIABLE BELT DRIVE SYSTEM

(75) Inventor: Joshua L. Roby, Battle Creek, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 11/220,212

(22) Filed: Sep. 6, 2005

(65) Prior Publication Data

US 2006/0019781 A1    Jan. 26, 2006

Related U.S. Application Data

(62) Division of application No. 09/973,373, filed on Oct. 9, 2001, now Pat. No. 6,962,543, which is a division of application No. 09/405,188, filed on Sep. 24, 1999, now Pat. No. 6,406,390.

(51) Int. Cl.
*F16H 59/10* (2006.01)
*F16H 55/00* (2006.01)
*F16H 55/56* (2006.01)

(52) U.S. Cl. ............................ 474/14; 474/12; 474/36; 474/46

(58) Field of Classification Search .................... 474/8, 474/23, 13–14, 46, 70, 37–39, 41–43
See application file for complete search history.

(56) References Cited

U.S. PATENT DOCUMENTS 2,420,100 A * 5/1947 Salsbury ....................... 474/46
2,529,743 A * 11/1950 Salsbury et al. .............. 474/14
2,543,337 A * 2/1951 Salsbury ....................... 474/14
3,230,787 A * 1/1966 Siegal ........................... 474/14
3,733,918 A * 5/1973 Domaas ....................... 474/14
4,052,908 A * 10/1977 Takagi et al. ................ 474/14
4,992,066 A * 2/1991 Watson ........................ 440/75
5,326,330 A * 7/1994 Bostelmann ................. 474/13
5,462,492 A * 10/1995 Miyata et al. ............... 474/38
5,516,332 A * 5/1996 Robert ......................... 474/13
6,149,540 A * 11/2000 Johnson et al. .............. 474/14

FOREIGN PATENT DOCUMENTS

JP       (01-255754 A   * 10/1989   ................. 474/14
JP       06-330995      * 11/1994

* cited by examiner

*Primary Examiner*—Marcus Charles
(74) *Attorney, Agent, or Firm*—Greg Dziegielewski, Esq.; Artz & Artz, P.C.

(57) ABSTRACT

A continuously variable belt drive system including a driving pulley assembly, a driven pulley assembly, and a V-shaped belt engaged to transfer rotary power therebetween is disclosed herein. The driving pulley assembly includes an idler pulley portion. As the belt speed decreases, the belt migrates downward within the driving pulley assembly until it falls within the idler pulley portions, thereby isolating the belt from the rotation of the driving pulley assembly. The driving pulley assembly also includes a belt tensioning mechanism that maintains proper belt tension at all speeds and drive ratios. The tensioning mechanism relies upon a pivotably mounted centrifugal weight arm to provide tensioning as a function of speed. A compression spring provides axial pressure to maintain belt tension over all drive ratios. The spring, acts against a curved cam edge on a pivoting lever arm, which arm transfers an axial force to the rear sheave of the driven pulley assembly.

8 Claims, 9 Drawing Sheets

CONTINUOUSLY VARIABLE BELT DRIVE SYSTEM

CROSS-REFERENCE TO RELATED APPLICATIONS

This is a division of U.S. patent application Ser. No. 09/973,373, filed on Oct. 9, 2001 and issued as U.S. Pat. No. 6,962,543, which is a division of U.S. patent application Ser. No. 09/405,188, filed on Sep. 24, 1999 and issued as U.S. Pat. No. 6,406,390

BACKGROUND OF THE INVENTION

The present invention concerns a continuously variable transfer drive assembly or transmission mechanism, such as the type suited for use in automotive applications to drive accessory devices. More particularly, the invention relates to a mechanically adjustable belt-type pulley system.

Automotive vehicles include a cooling system to dissipate heat developed by the vehicle power plant, such as an internal combustion engine. In a typical automotive vehicle, the lubrication system provides some cooling function as hot lubricant is pumped away from the engine. However, the bulk of the cooling requirements for the automotive vehicle is accomplished by air flowing through the engine compartment and across a radiator. Coolant flowing around the power plant extracts heat from the engine, which heat is subsequently dissipated through the vehicle radiator.

In automotive vehicles, the engine compartment is designed to permit flow of ambient air through the compartment and past the radiator. In most vehicles, a cooling fan is provided that increases the flow of air across the radiator. In some vehicle installations, the fan is driven by an electric motor that is independent of the vehicle engine. For smaller passenger cars, the electric motor approach can satisfy the cooling needs for the vehicle. However, unlike passenger cars, heavy trucks cannot use electric motors to drive the cooling fan. For a typical heavy truck, the cooling fan would require up to 50 horsepower to cool the engine, which translates to unreasonably high electrical power requirements.

In a typical automotive installation, whether light passenger or heavy truck, the cooling fan is driven by the vehicle engine. In one typical installation shown in FIG. 1, an engine 10 provides power through a drive shaft 11 to a transmission 12. Power to the driven wheels is accomplished through a differential 14. In addition to providing motive power, the engine 10 is also coupled to a transfer drive assembly 15. This assembly 15 provides power directly to a cooling fan 16 that is preferably situated adjacent the vehicle radiator 17.

A wide range of technologies is available to transmit power from the engine 10 to the rotating cooling fan 16. For instance, some transfer drive assemblies 15 are in the nature of on/off clutches. The clutches utilize a friction material to engage the fan when the clutch is actuated. A belt between an output shaft of the engine and the clutch provides rotational input to the clutch in relation to the engine speed. In another drive assembly, a viscous fan drive relies upon the shearing of viscous fluid within a labyrinth between input and output members of the drive. The engagement of the drive is controlled by the amount of fluid allowed into the labyrinth. Viscous drives suffer from many deficiencies. For instance, drives of this type are inherently inefficient because a great amount of energy is lost in heating the viscous fluid. For many viscous drives, this parasitic power loss can be as high as five horsepower.

Another difficultly experienced by viscous fluid fan drives is known as "morning sickness." When the vehicle is started cold, the fluid in the fan drive is more viscous than under normal operating conditions. This higher viscosity causes the drive to turn the cooling fan at full speed, which causes the cooling system to operate at maximum capacity during a time when the vehicle engine needs to be warming up. A further problem with viscous fan drives is that they require a residual speed even when fully disengaged. This residual speed is usually in excess of 400 r.p.m. and is necessary to allow enough fluid circulation within the drive labyrinth for the drive to re-engage on demand.

The most prevalent transfer drive systems for a vehicle cooling system rely upon a continuous belt to transfer rotational energy from the vehicle engine to the cooling fan. In the simplest case, one pulley is connected to an output shaft of the engine and another pulley is connected directly to the cooling fan. In this simple case, the speed of the cooling fan is directly tied to the engine, varying only as a function of the fixed diameters of the two pulleys. Typically, the ratio of these diameters generates a speed ratio greater than 1:1—i.e., the fan pulley rotates faster than the engine pulley.

One problem exhibited by fixed pulley fan drives is that the fan speed is limited to the fixed ratio relative to the engine input speed. For most vehicles, and particularly most heavy trucks, the maximum cooling air flow requirements occur at the engine peak torque operating condition, which is usually at lower engine speeds. Thus, in order to achieve the proper cooling flow rates, the cooling fan must be sized to provide adequate cooling at the lower engine speeds. The power generated by a fan is related to the cube of its speed. Thus, a fan sized to cool an engine at a lower speed, such as 1200 r.p.m., is grossly oversized at higher engine operating speeds, such as a typical rated speed of 2100 r.p.m. From a cooling standpoint, the significantly greater cooling power provided at higher speeds is not detrimental. However, this over-sizing of the fan equates to wasted power when the engine is not operating at its peak torque condition. For example, a typical 32-inch cooling fan operating at an engine rated speed of 2100 r.p.m., draws approximately 45 horsepower. Of this 45 horsepower, only a fraction, in the range of 10 horsepower, is actually necessary to meet the engines' cooling requirements at this speed.

In order to address the varying cooling needs throughout an entire engine operating range, various cooling systems have been developed. For instance, in one type of system, the blades of the fan are rotated to provide variable flow rates. In another application, the shapes of the fan blades themselves are altered to increase or decrease the flow rate at a constant fan rotational speed.

One approach to solving the problem of varying cooling needs in an automotive setting has been the continuously variable transmission (CVT) or variable transfer drive assembly. In its most fundamental design, the CVT utilizes a continuous belt having a V-shaped cross section. The belt is configured to engage conical friction surfaces of opposing pulley sheaves. The continuously variable feature of the CVT is accomplished by changing the distance between the sheaves of a particular pulley. As the sheaves are moved apart, the V-shaped belt moves radially inward to a lower radius of rotation or pitch. As the sheaves are moved together, the conical surfaces push the V-shaped belt radially outward so that the belt is riding at a larger diameter. The typical CVT is also sometimes referred to as an infinitely variable transmission in that the V-belt can be situated at an infinite range of radii depending upon the distance between the conical pulley sheaves.

Much of the development work with respect CVT's has been in providing a continuously variable transmission between a vehicle engine and its drive wheels. In a few instances, CVT's have been applied as an accessory drive. For example, NTN Corporation has developed a rubber belt CVT system that provides a constant accessory drive speed regardless of engine speed. The system using two spring-loaded adjustable pulleys, each having centrifugal weighs that compensate for changes in engine speed. In this system, as the engine speed increases, the centrifugal weights translate radially outward to exert a force on one sheave pushing it toward an opposing sheave. This change in diameter of the sheave maintains a fixed rotational speed, even as the engine speed increases, by altering the ratio of pulley diameters. This fixed speed is used to maintain a constant alternator speed.

Ideally, a transfer drive assembly, such as assembly 15 shown in FIG. 1, would turn the cooling fan only as fast as is necessary to maintain an optimal engine temperature. Controlling the cooling fan speed conserves power and improves the engine's overall efficiency. In addition, the transfer drive assembly should have the ability to turn the fan faster at lower engine speeds than at higher engine speeds, because the cooling requirements for the engine are greater during operation at low speed and high torque.

Thus far, no accessory drive assemblies are known that are capable of achieving all of these features. Although the continuously variable transmission has been beneficial in operation of cooling fans, the typical CVT cannot accomplish all of these particular factors.

SUMMARY OF THE INVENTION

The present invention contemplates a continuously variable belt pulley transfer assembly that addresses these prior deficiencies. In one embodiment, the transfer assembly includes a driving pulley assembly and a driven pulley assembly, with a continuous belt transferring rotary motion therebetween. The pulleys are each formed by forward and rear sheaves that define opposing conical surfaces. The drive ratio between the pulleys is determined by the position of the V-shaped belt between the conical surfaces of the sheaves.

In one feature of the invention, one pulley assembly, preferably the driving assembly, includes a belt tensioning mechanism that maintains proper belt tension at any speed and pulley drive ratio. The mechanism can include a weight arm that is pivotably mounted to a floating sleeve. The forward and rear sheaves forming the driving pulley are mounted to the floating sleeve for rotation with the sleeve. The sleeve is splined to a rotating drive shaft so the sleeve can slide freely along the drive axis while rotational motion is transmitted to the sleeve. The floating sleeve allows the driving pulley to align itself with the driven pulley when the driven pulley adjusts the drive ratio.

Rotation of the floating sleeve causes the weight arm to swing radially outward due to centrifugal effects. The weight arm bears against a roller mounted on the rear sheave, thereby providing an axial force to push the rear sheave toward the relatively stationary forward sheave. As the floating sleeve and driving pulley rotate faster, the axial force generated by centrifugal movement of the weight arm increases.

In another aspect of the tensioning mechanism, a spring and lever arm configuration is used to maintain proper belt tension as the drive ratio changes. The mechanism uses a spring plate tending to push the rear sheave toward the forward sheave. When the rear sheave is in its forward-most position, a compression spring associated with the spring plate is only slightly depressed so its axial force is minimal. The present invention contemplates a lever arm disposed between the compression spring and the rear sheave that helps maintain adequate axial force even when the spring is at its minimum compression. The lever arm is pivotably mounted to the floating sleeve and includes a roller at its free end that bears against the rear sheave. The compression springs are retained between the floating sleeve and a spring plate that is free to slide axially relative to the driving pulley. The spring plate includes a roller that contacts a cam edge of the lever arm. Spring force is thus transmitted through the spring plate roller, to the lever arm and eventually to the rear sheave via another roller. The cam edge of the lever arm has a curvature that is calibrated to maintain the necessary axial force at all positions of the rear sheave, including its forward-most position.

In yet another feature of the invention, one of the pulleys, again preferably the driving pulley, includes a disengagement mechanism that isolates the belt from the rotation of the pulley. In one embodiment, the disengagement mechanism includes an idler pulley portion between the forward and rear sheaves of the driving pulley. The idler pulley portion defines conical surfaces that transition into the conical surfaces of the primary pulley sheaves. The idler pulley portions are isolated from the forward and rear sheaves by bearings. As the belt sinks lower into the pulley groove it eventually contacts the idler pulley portions. At this point, the belt is no longer in contact with the driving pulley sheaves, so rotation of the driving pulley is not translated to rotation of the belt.

The invention also contemplates improvements to a driven pulley member. The driven member includes a ratio adjustment mechanism that utilizes an electric motor and gear arrangement to vary the distance of the rear sheave relative to the forward sheave of the pulley. An actuation screw is provided that can be threaded into and out of a split nut by operation of the electric motor. As the actuation screw is threaded into the split nut, it advances along the axis of the driven pulley assembly. As the screw advances it applies pressure through intermediate components on the rear sheave, pushing it axially toward the forward sheave. Conversely, as the actuation screw is unthreaded from the split nut, the axial pressure on the rear sheave is relieved and the sheave moves away from the forward sheave.

The invention further contemplates a fail-safe feature that restores the driven pulley assembly to a predetermined drive ratio in the event of a failure of power to the electric motor. In one aspect, this feature relies upon engagement fingers to hold the separable components of the split nut together to maintain the threaded engagement with the actuation screw. Once the components of the split nut are separated, the internal threads of the nut are disrupted and the threaded engagement with the actuation screw is terminated. In one embodiment, a solenoid holds the engagement fingers in contact with the split nut components. When power to the solenoid is interrupted, the solenoid can no longer hold the engagement fingers in position. A return spring can then push the fingers back, allowing the portions of the split nut to expand apart.

In accordance with certain features of the invention, once the split nut is disrupted, the actuation screw is driven forward by operation of a large compression spring. As the actuation screw is propelled forward, it causes the rear sheave to be pushed forward until the sheave reaches a predetermined drive ratio position.

It is one object of the invention to provide a continuously variable transfer system that provides mechanical adjustment of the drive ratio of the system. A further object is to provide such a system that maintains sufficient tension in the belt at all speeds and drive ratios.

A further object of the invention is accomplished by features that restore the transfer system to a predetermined drive ratio on the occurrence of particular failures. Another object is to provide a transfer system that can achieve a wide range of drive ratios. Yet another object achieved by the invention is to provide means for disengaging the continuous belt from rotation under established conditions.

These and other objects, as well as several benefits of the invention can be readily discerned from the following written description of the invention, as illustrated by the accompanying figures.

DESCRIPTION OF THE PREFERRED EMBODIMENTS

Figure 1:
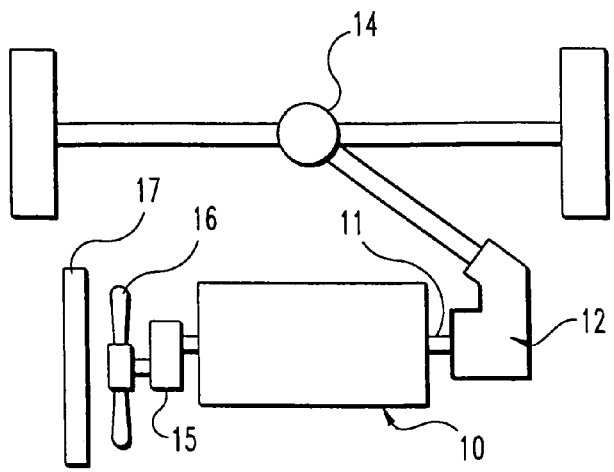
FIG. 1 is schematic representation of an engine, transmission and cooling system.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alternations and further modifications in the illustrated devices and described methods and further applications of the principles of the invention which would normally occur to one skilled in the art to which the invention relates.

The present invention concerns a continuously variable transmission, or transfer drive assembly, particularly suited for driving auxiliary devices in an automotive vehicle. Of course, the principles of the invention can be employed in a variety of applications where continuously or infinitely variable speed ratios are desired.

In general terms, the invention provides a driving member assembly that incorporates mechanical tensioning features to maintain proper tension on a V-shaped belt driven by the rotating sheaves of the driving pulley. The driving member assembly also includes a disengagement mechanism operable to isolate the belt from the rotation of the pulley sheaves. In another general aspect of the invention, the continuously variable transfer drive assembly includes a driven member assembly that utilizes mechanical gearing to adjust the relative position between the rotating sheaves of the driven pulley. In addition, the driven member assembly includes a fail-safe mechanism that automatically restores the driven pulleys to a predetermined pitch or pulley ratio upon failure of power supplied to the components of the driven member assembly.

Figure 2:
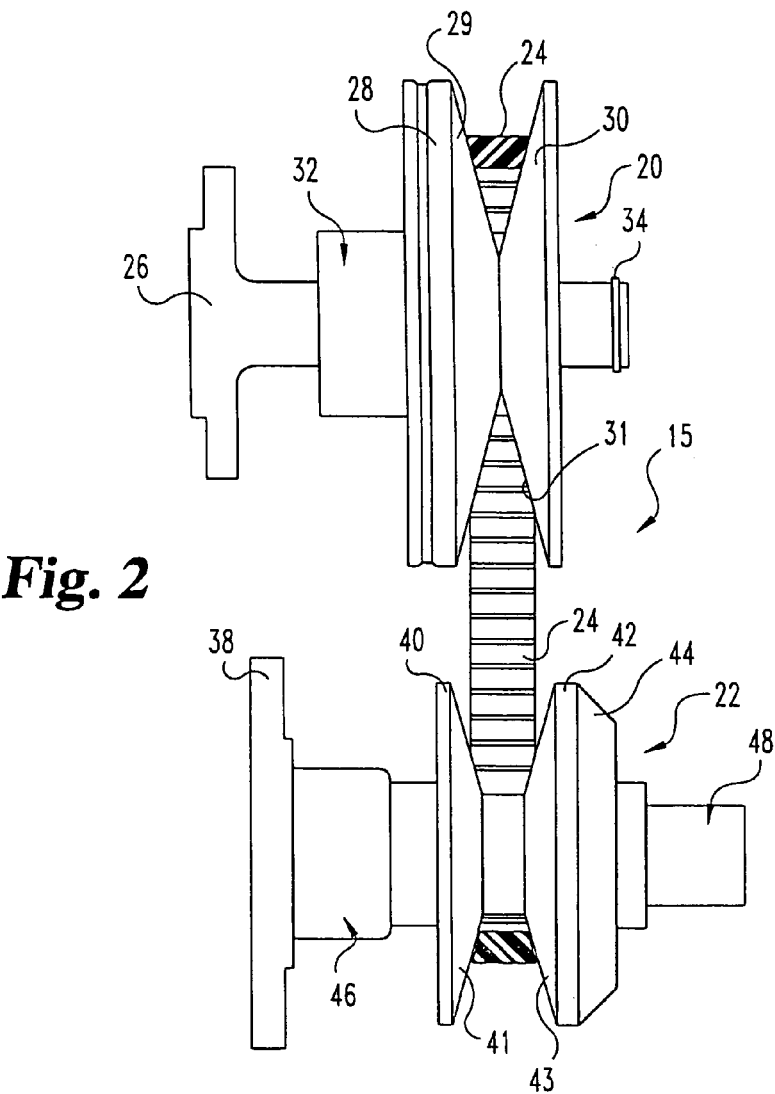
FIG. 2 is a block representation of one type of transfer drive assembly utilizing a continuous belt and rotating pulley according to a preferred embodiment of the invention.

With this general background, further details of the various embodiments of the invention will be disclosed with specific reference to the figures. Referring first to FIG. 2, the general components of the transfer drive assembly 15 according to one embodiment is shown. In particular, the transfer drive assembly 15 includes a driving member assembly 20 that is connected to a source of rotary power, such as an internal combustion engine, and a driven member assembly 22, which is connected to a driven device, such as an auxiliary device associated with a vehicle. In the illustrated embodiment, the driven member assembly 22 can be connected to a cooling fan forming part of the engine cooling system. A continuous belt 24 is connected between the pulleys of the driving member assembly 20 and the driven member assembly 22. The belt 24 is preferably V-shaped and can be of a variety of known configurations and materials. In the preferred embodiment, the belt 24 is driven by frictional contact with the pulley of the driving member assembly. Likewise, the driven member assembly 22 is propelled through frictional contact with the rotating belt.

In the present embodiment, the driving member assembly 20 includes a driving shaft 26 that can be configured to mount to the drive shaft of the engine or an auxiliary or PTO shaft driven by the automotive engine. The driven member assembly 22 can include a fan mounting cover 44 with a pattern of screw bores 45 (FIG. 14) to which the engine cooling fan can be engaged.

The present invention contemplates a conical pulley system engaged by the continuous belt to transfer rotary power from the driving member assembly 20 to the driven member assembly 22. Thus, the driving member assembly 20 includes a rear sheave 28, having a conical engagement surface 29, and a forward sheave 30, also having a conical engagement surface 31. As is well known in the art, the two sheaves 28 and 30 combine to form a pulley for driving the continuous belt 24. The V-shape of the belt 24 conforms to the opposing conical surfaces 29 and 31 to provide solid frictional contact during rotation of the driving member assembly 20.

The driving member assembly 20 further includes a belt tensioning mechanism 32 that is preferably operably engaged to the rear sheave 28. The tensioning mechanism maintains tension in the rotating belt 24 by providing pressure to the rear sheave 28. Pressure on the rear sheave 28 pushes it toward the forward sheave 30 which consequently narrows the gap between the conical surfaces 29, 31. As this gap is narrowed, the continuous belt 24 is urged subradially outward to thereby maintain appropriate tension on the belt.

For most pulley belt-driven automotive systems, the position of the driving and driven pulleys is fixed to maintain appropriate tension in the belt. However, with the use of a continuously variable system, the belt 24 can be driven by or drive the appropriate pulleys at differing radii. Consequently, the belt tensioning mechanism 32 is important to maintain proper belt tension, ensure efficient transfer of rotary motion between the two pulleys, and eliminate belt squeal associated with a loose or worn belt.

In a further feature of the driving member assembly 20, the pulley formed by the rear sheave 28 and forward sheave 30 is permitted to slide axially along the driving shaft 26. Changing the pulley ratio between the driving member assembly 20 and driven member assembly 22 causes the centerline of the belt 24 to shift axially relative to the driving shaft 26. Thus, the pulley formed by the sheaves 28, 30 must be free to slide axially to maintain proper alignment between the driving member pulley and driven member pulley. Without this feature, the continuous belt 24 will be skewed between the two pulleys, increasing belt wear and the risk of belt breakage. In the illustrated embodiment, the axial travel of the sheaves is limited at one end by the flange of the driving shaft 26, and at an opposite end of the driving shaft 26 by a travel stop 34.

A second component of the continuously variable drive assembly 15 is the driven member assembly 22. The assembly 22 can be fixed to the vehicle, preferably to the engine, by way of a mounting base plate 38. The driven member assembly 22 also defines a rotating pulley by the combination of a rear sheave 40 and a forward sheave 42. As with the driving member, the two driven sheaves 40, 42 define conical engagement surfaces 41, 43, respectively. A fan mounting cover 44 is engaged to the forward sheave 42 so that rotation of the pulley sheaves causes rotation of the cover 44, and ultimately rotation of a fan attached to the cover.

In accordance with the preferred embodiment of the invention, the continuously variable ratio feature of the assembly 15 is accomplished by a ratio adjustment mechanism 46 integrated into the driven member assembly 22. In general terms, the adjustment mechanism 46 adjusts the position of the rear sheave 40 relative to the forward sheave 42 to increase or decrease the gap between the two sheaves. As explained above, moving the two sheaves together causes the belt 24 to be forced radially outward to a larger driven radius. Similarly, moving the two sheaves apart allows the belt to drop deeper into the pulley groove, and therefore run at a smaller driven radius. It is preferred that the adjustment mechanism 46 be associated with the driven pulley, rather than the drive pulley. However, a similar mechanism can be incorporated into the driving member assembly 20, or into both driving and driven assemblies.

In a further feature of the preferred embodiment of the invention, the driven member assembly 22 includes a fail-safe mechanism 48. In one embodiment, the ratio adjustment mechanism 46 is powered by an electric motor. When power is interrupted to the motor, the fail-safe mechanism 48 forces the driven member assembly 22 to a predetermined pulley ratio. Details of the fail-safe mechanism 48 will be developed herein.

Referring now to FIGS. 3–12, specific features of the driving member assembly 20 will be explained. The driving shaft 26 can include a mounting flange 50 configured to engage a rotating shaft powered by the vehicle engine. The driving shaft 26 defines a splined shaft 51 extending substantially along the length of the driving member assembly 20. The travel stop 34 in the preferred embodiment can be a snap-ring fixed within a groove at the end of the splined shaft 51. At the opposite end of the shaft, and adjacent the mounting flange 50, the driving shaft 26 defines a rear stop surface 52 which further limits the axial travel of the rear and forward sheaves 40, 42. More specifically, the rear stop surface 52 is contacted by a floating sleeve 55 that supports the entire driven member assembly, including the pulley sheaves 40, 42, on the driving shaft 26.

It is understood that the driving shaft 26 and its integral splined shaft 51 are driven by a source of rotary motion. The rotation of the splined shaft 51 is transmitted to the two pulley sheaves through the floating sleeve 55. The floating sleeve includes inner splines 56 that mate with the splined shaft 51. This splined interface between the floating sleeve 55 and shaft 51 allows rotary motion to be transmitted between the two components, while permitting the floating sleeve to slide axially along the length of the shaft between the snap-ring 34 and rear stop surface 52.

At an end of the floating sleeve 55 adjacent the travel stop 34, the sleeve defines outer threads 57. These threads mate with corresponding inner threads 60 defined in the forward sheave 30. The outer threads 57 and inner threads 60 are preferably machined threads so that the forward sheave 30 can be firmly engaged, or fixed, to the forward end of the floating sleeve 55. From the perspective of the floating sleeve 55, the forward sheave 30 is stationary, meaning that the sheave 30 cannot move axially relative to the sleeve. In contrast, the rear sheave 28 is arranged to slide axially relative to the sleeve 55.

The floating sleeve 55 also defines outer splines 58 situated beneath the rear sheave 40. The rear sheave 28 then, also defines mating inner splines 62. Again, the splined interface between the floating sleeve 55 and rear sheave 28 allows the sheave to translate axially along the sleeve, while rotary power is transmitted between the two components. In the preferred embodiment, a collar 63 is disposed around the outside of the rear sheave 28 adjacent the inner spline 62. In the illustrated embodiment, the rear sheave 28 is movable while the forward sheave 30 is relatively stationary. It is understood, of course, that the roles of the two sheaves of the driving pulley can be reversed, with appropriate modification to the other components of the driving member assembly 20.

In one feature of the invention, the driving member assembly 20 includes a disengagement mechanism 65 at the innermost radius of the pulley formed by the rear sheave 28 and forward sheave 30. More specifically, the forward sheave 30 defines a bearing recess 61 (see FIG. 4), and the rear sheave 28 defines a similar bearing recess 64 (see FIG. 5). Disposed within the forward bearing recess 61 is a front idler 66 and bearing 68. The front idler defines a conical surface 67. Likewise, the rear bearing recess 64 receives a rear idler 69 supported by a rear bearing 71. The rear idler also defines a conical surface 70 so that the front and rear idlers together define, in essence, a separate conical pulley section.

Since the two idlers 66, 69 are supported relative to the corresponding sheaves 28, 30 by bearings, the pulley formed by the idlers is rotationally isolated from the pulley formed by the sheaves 28, 30. In the operation of the driving member assembly 20, as the drive assembly 15 moves to a lower ratio, the belt 24 moves lower between the driving member sheaves. When the belt moves far enough, it contacts the conical surfaces 67, 70 of the idlers 66, 69, respectively, rather than the surfaces of the primary sheaves 28, 30. When the belt is at this location, the rotation of the belt ceases since the idlers 66, 69 do not rotate with the rotating pulley sheaves. In this configuration, the mechanism 65 completely disengages the driven member assembly 22, and consequently the driven auxiliary device, from the rotary power source. In the case of a cooling fan, when the belt 24 reaches the disengagement mechanism 65, the rotation of the fan stops.

The driving member assembly 20 further includes a belt tensioning mechanism 32. Since the amount of belt tension required to prevent slip depends on rotational speed, the mechanism 32 applies increasing axial force to the belt as the speed increases. In accordance with a preferred embodiment of the invention, the belt tension is variable instead of constant, to increase the belt life and reduce component fatigue from high belt loads. In other words, at lower rotational speeds, lower belt tension is acceptable. Conversely, at higher speeds, higher belt tension is necessary. Thus, the belt tensioning mechanism 32 is configured to provide greater axial force at higher rotational speeds.

The inventive belt tensioning mechanism 32 contemplates two tensioning elements. The first element provides tensioning force as a function of the rotational speed of the driving member assembly 20. Specifically, this first element is a weight arm assembly 100. The weight arm assembly 100 includes a number of weight arms 101 that are pivotally mounted to the floating sleeve 55 at a pivot 102. As shown in more detail in FIG. 8, the sleeve 55 defines a weight arm slot 103, with the pivot 102 at one end of the slot. The weight arm slot 103 provides clearance for pivoting of the weight arm 101.

The weight arm 101 carries a centrifugal weight 104 that is specifically sized to provide a predetermined axial force as a function of rotational speed. In one specific embodiment, the centrifugal weights 104 are formed of depleted uranium due to the high density of the material. In a specific embodiment, the weight arm assembly 100 includes three weight arms 101 symmetrically disposed at 120° intervals around the floating sleeve 55. At least three weights are preferred to avoid torsional vibration problems. More weight arms and weights can be utilized provided they are symmetrically arranged around the floating sleeve 55. The magnitude of the centrifugal weights are calibrated based on the maximum required axial force and the centrifugal force generated by rotation of the weights. In the illustrated embodiment where the assembly drives an automotive cooling fan, the weights 104 can be about 1–2 pounds.

It is understood that as the floating sleeve 55 rotates with driving shaft 26, the weight arms 101 gradually pivot outward about pivot point 102 due to centrifugal effects. As the weight arms 101 swing outward, they transmit an axial force to rear sheave 28 to push it closer to the relatively stationary forward sheave 30. This force transmission occurs through a roller 107. More particularly, the roller 107 is affixed to the rear sheave 28 through a roller bracket 106. The bracket is mounted to the rear-most surface of the rear sheave by a mounting screw 108 engaged within screw bore 113 (see FIG. 6). The bracket 106 supports the roller 107 so that as the weight arm 101 presses against the roller, force is transmitted to push the rear sheave 28 axially.

The tension in the belt 24 tends to urge the belt deeper into the pulley groove between the sheaves 28, 30. Thus, as the rotational speed of the shaft 26 decreases and the weight arms 101 decline, the belt will act to push the rear sheave 28 rearwardly to maintain constant pressure between weight arm 101 and the roller 107. In order to further help maintain the weight arm 101 in contact with the roller 107, a tether in the form of an extension spring 110 is connected between the arm and a spring bracket 109. The spring bracket is fixed to the rear sheave 28 beneath the roller bracket 106 using the same mounting screw 108. In the specific embodiment, the spring bracket 109 is partially disposed within a bracket recess 111 (see FIG. 6) to accommodate a reasonable length for the extension spring 110. The tether or extension spring 110 constantly pulls the weight arm 101 back toward the roller 107. This prevents problems with the driving member assembly 20 as it initially begins rotating, when the weight arm would ordinarily be fully declined in the absence of any centrifugal effects. Once the shaft 26 starts to rotate, however, the weight arms 101 would be flung outward, which can cause damage to the arms and rollers 107. The extension spring 110 eliminates this difficulty by keeping the idle position of the arms constrained.

Belt tension is not only a function of rotational speed, it is also affected by the drive or pulley ratio—i.e., the ratio between the diameters of the driving and driven pulleys. In order to account for this tensioning relationship, the belt tensioning mechanism 32 includes a second component in the form of a spring pack and lever system. In accordance with one embodiment of the invention, the floating sleeve 55 is configured at its rear end into a number of spring guide blades 75, shown best in FIG. 7. In the illustrated embodiment, three such blades are utilized. Each blade includes two bores through which a spring guide 76 (FIG. 3) extends. An enlarged head 77 of the spring guides 76 prevent their full passage through the blades 75. A compression spring 80 is mounted over each of the spring guides 76. In the illustrated embodiment, six such springs are utilized, two each for each guide blade 75. The compression springs 80 are disposed between the floating sleeve 55 and the rear sheave 28. Thus, the springs 80 maintain a continuous pressure against the rear sheave 28, regardless of the position of the belt relative to the pulley sheaves.

However, it is well-known that the force supplied by a compression spring is directly related to its displacement. Thus, when the rear sheave 28 is moved to its fullest rearward extent (to the left in FIG. 3), the springs 80 generate their maximum restorative force. By the same token, when the rear sheave 28 is moved to its forward limit of travel, the springs 80 are only minimally depressed, so the force that they apply is considerably weaker. When the belt is at its maximum radially outward position, which can typically correspond with its highest rotational speed, the force being applied by the compression springs 80 is at its lowest, which means that the spring pack is only minimally effective in maintaining tension in the belt 24.

In order to address this problem, a special lever system is incorporated in one feature of the invention. With this feature, a spring plate 82 is slidably disposed over the rear sheave collar 63. The spring plate defines a spring bore 83, as depicted best in FIG. 9. A spring cup 84 extends though each spring bore 83 and is held in position against the rear surface of the spring plate 82. The compression spring 80 is then nested within each spring cup 84 so that the springs react against the guide blades 75 of the floating sleeve 55 to push forward against the spring plate 82.

Figure 3:
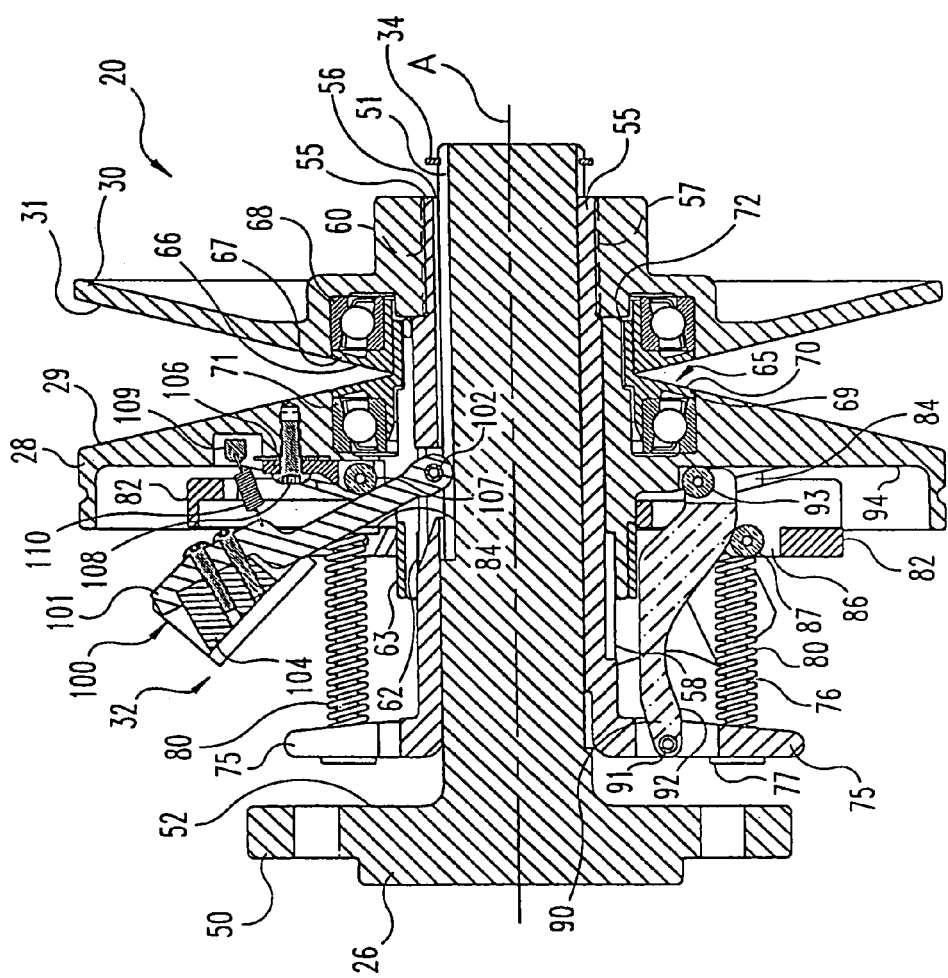
FIG. 3 is an enlarged side cross-sectional view of the driving member of the transfer drive assembly depicted in FIG. 2.
Figure 4:
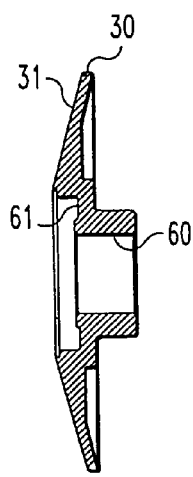
FIG. 4 is a side cross-sectional view of a forward pulley sheave of the driving member assembly depicted in FIG. 3.
Figure 5:
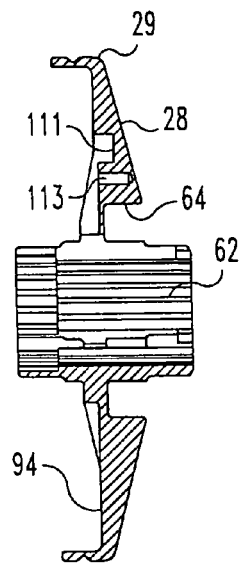
FIG. 5 is a side cross-sectional view of a rear pulley sheave of the driving member assembly shown in FIG. 3.
Figure 6:
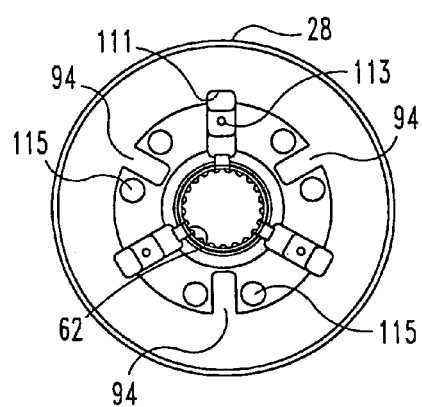
FIG. 6 is an end elevational view of the rear sheave shown in FIG. 5.
Figure 7:
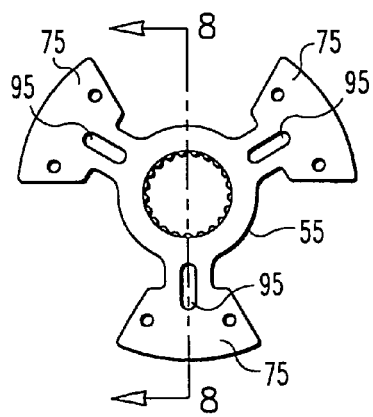
FIG. 7 is an end elevational view of a floating sleeve used in the driving member assembly shown in FIG. 3.
Figure 8:
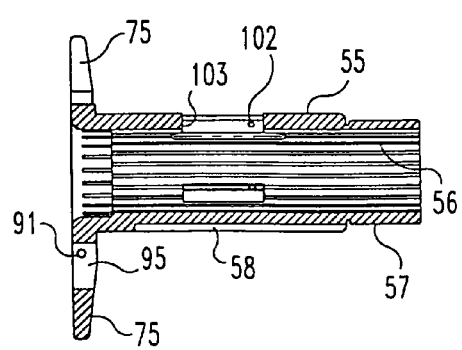
FIG. 8 is a side cross-sectional view of the floating sleeve depicted in FIG. 7.
Figure 9:
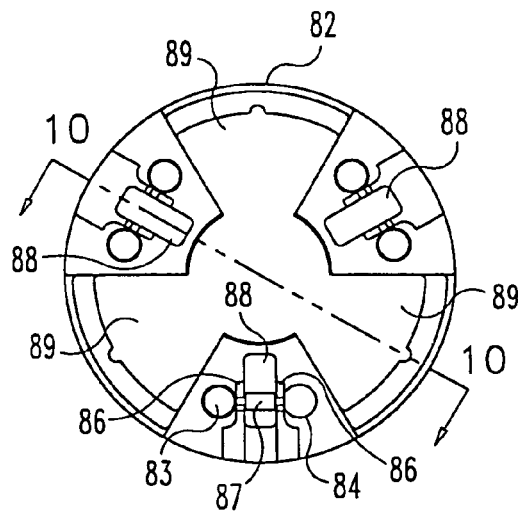
FIG. 9 is an end elevational view of a spring-plate used in the driving member assembly shown in FIG. 3.
Figure 10:
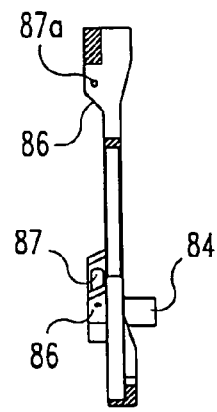
FIG. 10 is a side elevational view of the spring-plate shown in FIG. 9.

Between each of the spring bores 83 is defined a roller support flange 86. Each flange 86 supports a spring plate roller 87 engaged at pin bores 87*a*. The spring plate 82 further defines a lever slot 88 immediately adjacent or beneath each spring plate roller 87. The slots 88 are defined to receive a lever arm 90 extending therethrough (see FIG. 3). Each lever arm 90 is pivotally mounted to the floating sleeve 55 at a pivot point 91. The pivot point is disposed within a lever slot 95 (see FIGS. 7 and 8) so that the lever arm 90 has clearance to pivot relative to the guide blades 75. The lever arm 90 includes a cam-edge 92 that bears directly against the spring plate roller 87. The arm further includes a lever arm roller 93 rotatably mounted at the end of the arm opposite the pivot 91, as best shown in FIG. 3.

The lever arm roller 93 rides on a force transmitting surface 94 (see FIGS. 3, 5, and 6) defined in the rear surface of the rear sheave 28. It can thus be appreciated that the force generated by the compression spring 80 and reacted against the guide blades 75, is applied to the spring plate 82 by way of the spring cups 84. The spring plate 82 is urged forward (to the right in FIG. 3) so the spring plate roller 87 contacts and pushes the lever arm 90. As the lever arm 90 is pushed, force is transmitted directly to the rear pulley sheave 28 through the lever arm roller 93.

In the other direction, as the rear sheave 28 moves rearward, or away from the forward sheave 30, the lever arm 90 rotates about the pivot point 91. At the same time, the lever arm roller 93 rides radially outwardly along the force transmitting surface 94. The cam-edge 92 then pushes against the spring plate roller 87 to thereby translate the spring plate actually rearwardly (to the right). As the spring plate is translated, the springs 80 are compressed even further.

In a further feature of the driving member assembly, the rear sheave 28 includes a support hub 72. This support hub underlays the forward sheave 30. When the rear sheave 28 is at its rearmost position, the support hub 72 is exposed in the gap between the two sheaves, as best seen in FIG. 12.

Figure 11:
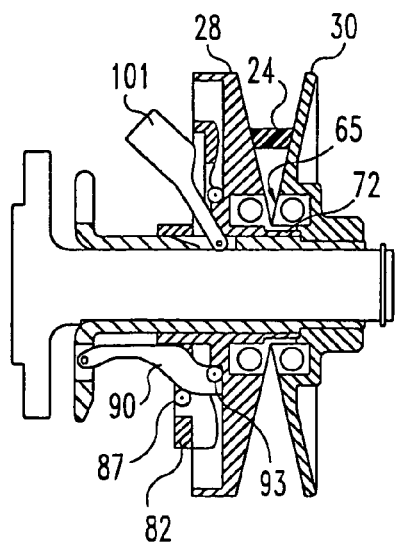
FIGS. 11 and 12 are side partial cross-sectional representations of the driving member assembly shown with the pulley sheaves in two orientations.
Figure 12:
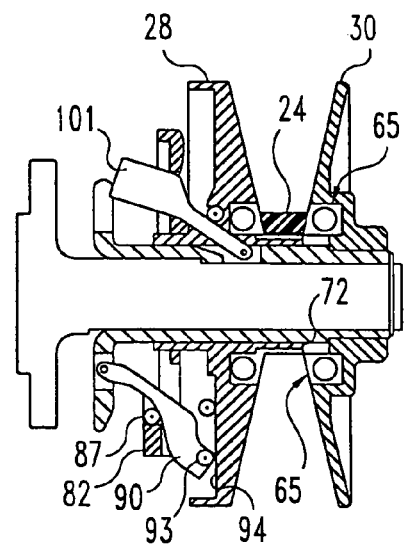

This action of the driving member assembly 20 is illustrated in the diagrams of FIGS. 11 and 12. In the configuration shown in FIG. 11, the driving member assembly 20 is operating substantially at its maximum speed. At this speed, the forward and rear sheaves are united and the support hub 72 is disposed fully underneath the forward sheave 30. The weight arm 101 is at its greatest radial orientation and the lever arm 90 is at the innermost end of the force transmitting surface 94.

As the speed of the rotational input decreases, the weight arms 101 gradually recline, allowing the rear sheave 28 to translate axially rearward. As the rear sheave moves in that direction, it bears against the lever arm 90 causing the arm to rotate about its pivot point 91. At the same time, the lever arm, in particular the cam-edge 92, pushes against the spring plate roller 87, causing the spring plate 82 to translate axially rearward. This movement compresses the springs 80 (not shown in FIG. 12).

In order to maintain a uniform force applied by the compression springs 80, the cam-edge 92 of the lever arm 90 adopts a predefined curvature. In the specific embodiment, the curvature is a flattened S-shape as shown in FIG. 3. This curvature of the cam-edge 92 allows the springs 80 to be pre-compressed to an axial force against the rear sheave 28 sufficient to maintain proper belt tension even at the highest pulley ratios. At the same time, the configuration of the cam-edge 92 regulates the axial force transmitted to the rear sheave 28 as the compression springs 80 are depressed when the driving member assembly 20 is in the configuration shown in FIG. 12.

In the illustrated embodiment, the spring plate 82 provides a number of spaced openings 89 between each of the roller support flanges 86. These openings 89 are oriented for passage of each weight arm 101. As the configuration of the spring plate 82 illustrates, the weight arms are angularly offset from the spring pack portions of the assembly. In the illustrated embodiment, three weight arms are provided, requiring three openings 89 in the spring plate. Of course, additional weight arms can be utilized. It is important, however, to have the arms oriented symmetrically around the driving member assembly to avoid vibration problems associated with an eccentric weight.

Figure 13:
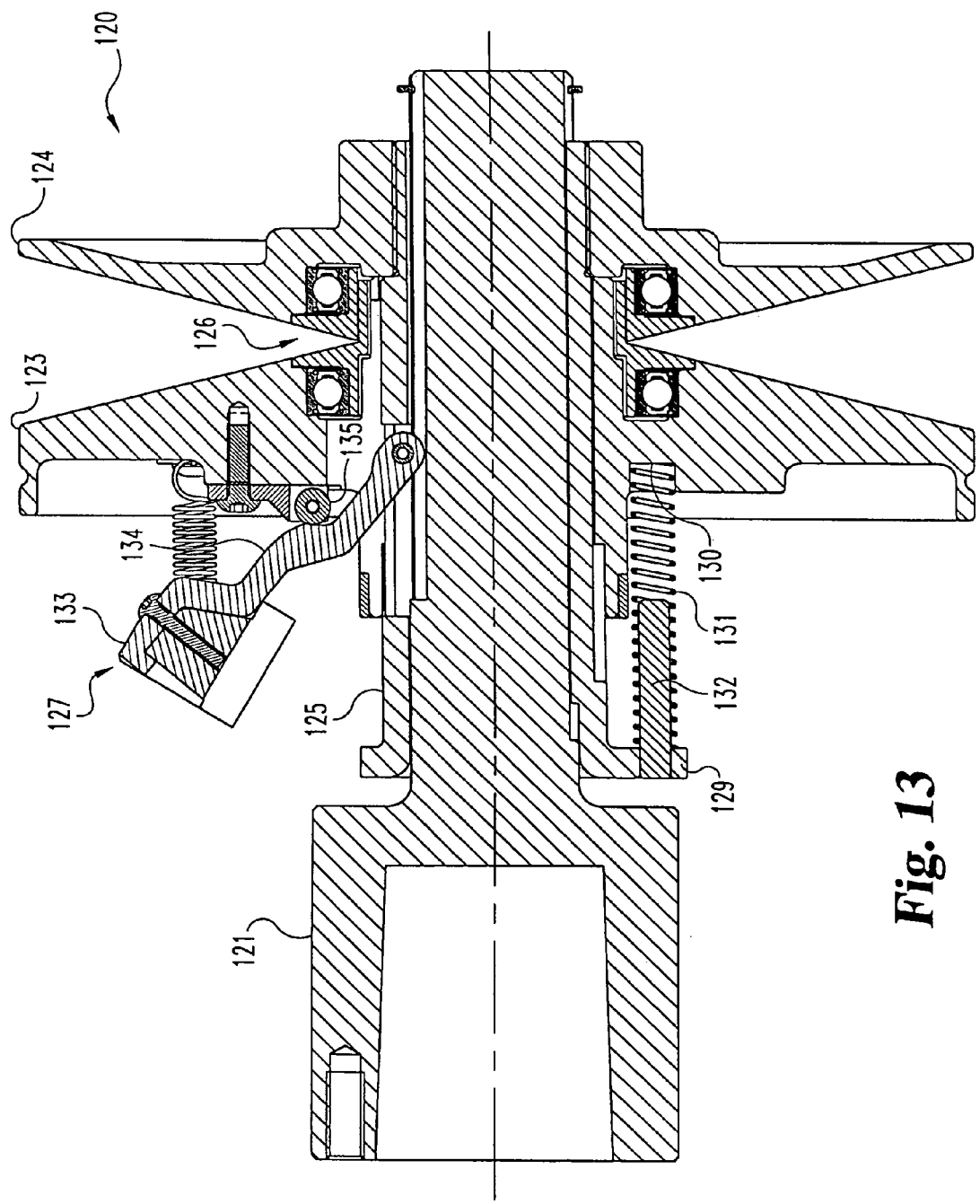
FIG. 13 is a side cross-sectional view of a further embodiment of a driving member assembly for use as part of the transfer drive assembly shown in FIG. 2.

An alternative embodiment of the driving member assembly is depicted in FIG. 13. In particular, the assembly 120 includes a driving shaft 121 having a different configuration for mating with an output shaft of the engine. The assembly 120 includes a rear sheave 123 and a forward sheave 124 that operates similar to the sheaves for the driving member assembly 20. Both sheaves are supported on a floating sleeve 125 that is actually movable along the length of the shaft 121. The driving member assembly can also include a disengagement mechanism 126 similar to the mechanism 65 described above. Likewise, the assembly 120 can include a weight arm assembly 127 that centrifugally tightens the belt riding between the sheaves 123, 124.

In one modification from the prior embodiment, the floating sleeve 125 supports a spring guide 132 onto which a compression spring 131 is mounted. The rear sheave 123 defines a spring recess 130 in line with the spring guide 132. The compression spring is then engaged within the recess so that it provides outward forces against the floating sleeve 125 and directly against the rear sheave 123. In this configuration, the lever arm 90 of the prior embodiment is eliminated.

In place of the lever arm, the weight arm assembly 127 includes a specially configured weight arm 133. Specifically, the weight arm defines a cam-edge 134 that bears against a roller 135 supported on the rear sheave 123. The cam-edge 134 follows a specific configuration to optimize the axial force applied to the rear sheave 123 at the higher rotational speeds. The cam-edge 134 of the weight arm 133 follows a geometry similar to the cam-edge 92 of the lever arm 90 in the previous embodiment. In both cases, appropriate tensioning force is maintained throughout the range of rotational speeds.

Details of the driven member assembly 22 are depicted in FIGS. 14–20. As expressed above, the driven member assembly includes a ratio adjustment mechanism 46 that operates on a movable rear sheave 40. In addition, the driven member assembly includes a fail-safe mechanism 48 that is integrated with the ratio adjustment mechanism 46 to account for a loss of power to the ratio adjustment mechanism. In accordance with a preferred embodiment of the invention, the adjustment mechanism is motor driven. Thus a loss of electrical power to the motor can cause difficulties with respect to the pulley ratio in the absence of a fail-safe mechanism.

Figure 14:
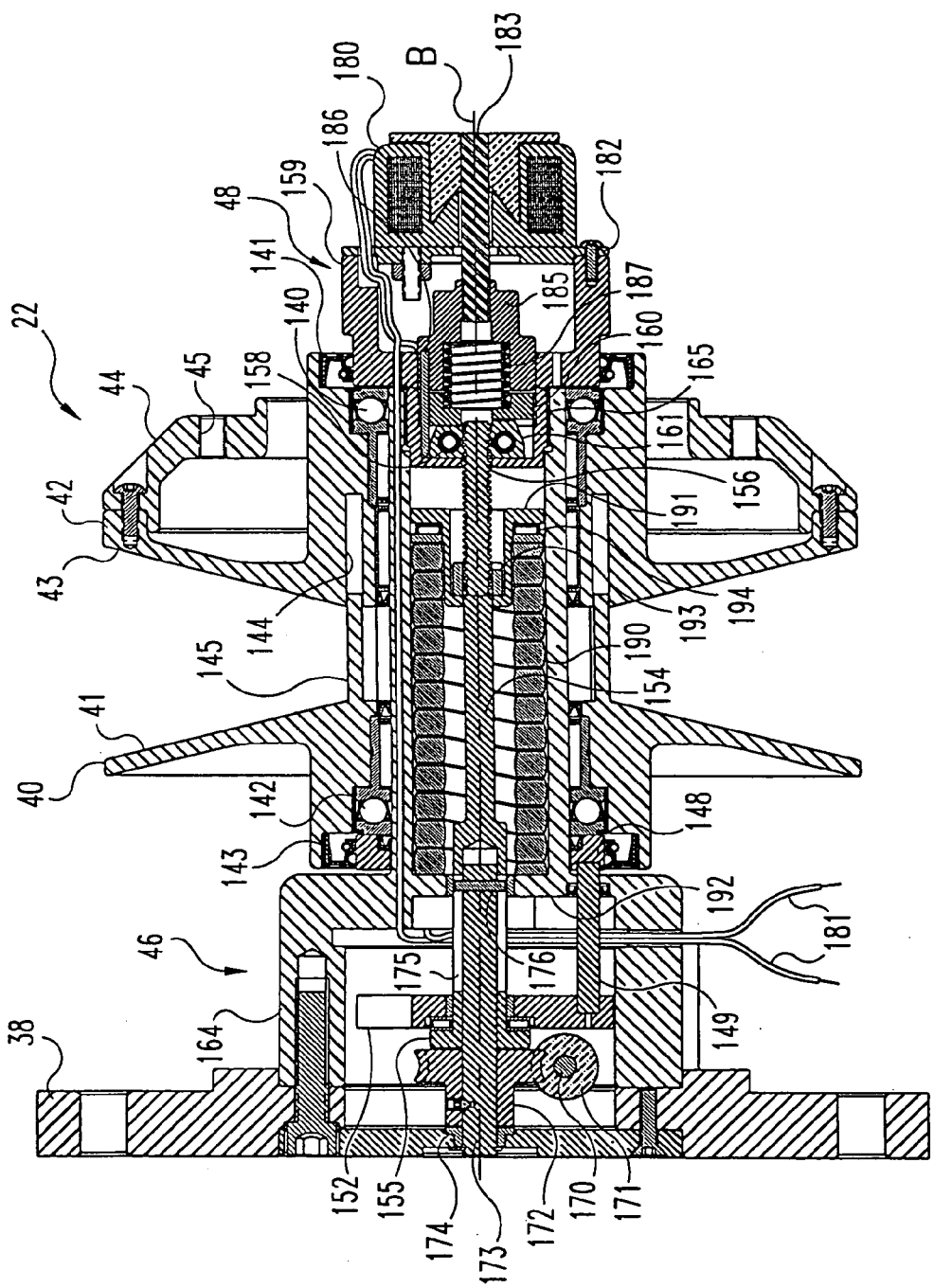
FIG. 14 is a side cross-sectional view of a driven member assembly for use with the transfer drive assembly shown in FIG. 2.

Turning to FIG. 14, it can be seen that the forward sheave 42 is rotatably supported on a needle/thrust bearing 140. An oil seal 141 is also provided between the rotating sheave and non-rotating components of the driven member assembly 22. Likewise, the rear sheave 40 is supported on a combination needle/thrust bearing 142. A rotating seal 143 is also provided between rotating rear sheave 40 and the stationary elements of the driven member assembly.

In one feature of the driven member assembly, the rear sheave 40 is interlocked with the forward sheave 42 so that both components rotate together. In order to accomplish the ratio adjustment feature, however, the rear sheave 40 must be permitted to move axially with respect to the relatively stationary forward sheave 42. Thus, in the illustrated embodiment the forward sheave 42 is provided with a number of slots 144. The rear sheave 40 includes a like number of interlocking prongs 145. A preferred arrangement of the slots and prongs is depicted in the end view of the rear sheave 40 shown in FIG. 16. It can be seen that the interlocking slots and prongs 144, 145 are arc segments. In the specific embodiment, six such interlocking components are provided to adequately transfer torque between the two components and maintain their unison rotational operation. The prongs 145 are configured to readily slide axially along the length of a corresponding slot 144.

The ratio adjustment mechanism 46 relies upon the application of a mechanical force against the rear sheave 40 to move it closer to or further away from the forward sheave 42. In the preferred embodiment, the adjustment mechanism 46 includes a bearing pressure plate 148 that is at least partially disposed within the rear sheave 40. The bearing pressure plate 148 directly contacts and presses against the bearing 142 that rotationally supports the rear sheave 40. The adjustment mechanism 46 further includes a number of force pins 149 that press against the bearing pressure plate 148. The force pins 149 are supported by a pressure plate 152.

Figure 17:
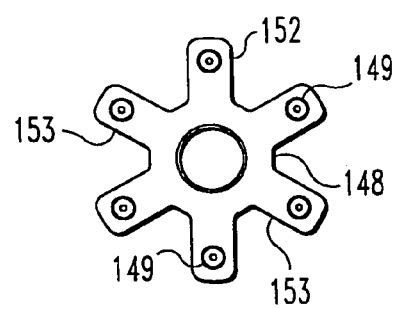
FIG. 17 is an end elevational view of bearing pressure plate used in the driven member assembly shown in FIG. 14.
Figure 16:
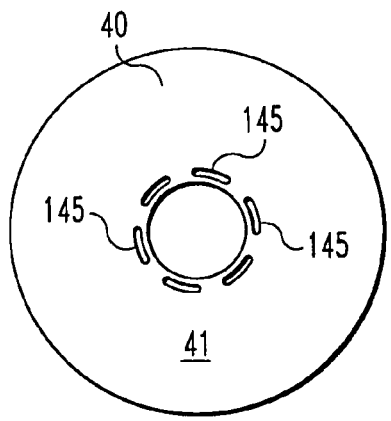
FIG. 16 is an end elevational view of a rear sheave of the driven member assembly shown in FIG. 14.

In the preferred embodiment, as shown in FIG. 17, the pressure plate 152 includes a plurality of radially extending spokes 153. A force pin 149 is connected at the end of each of the spokes 153. Preferably, six such spokes are provided, along with corresponding force pins, uniformly dispersed around the circumference of the pressure plate 152. In this way, pressure applied by the force pins 149 is evenly distributed against the bearing pressure plate 148.

Movement of the pressure plate 152 is accomplished by operation of an actuation screw 154. Specifically, the actuation screw 154 includes an enlarged head 155 that bears against the pressure plate 152 through a thrust bearing. The opposite end of the screw 154 defines a screw threaded portion 156. The threaded portion 156 is configured to threadedly engage internal screw threads 162 of a split nut 158. In the illustrated embodiment, the split nut is disposed beneath the forward sheave 42.

In operation, the actuation screw 154 is rotated so that the threaded portion 156 is threaded into the split nut 158. As the actuation screw 154 is continuously threaded, the head 155 bears against the pressure plate 152, which causes the force pins 149 to push against the bearing pressure plate 148. Continued rotation of actuation screw 154 ultimately causes the rear sheave 40 to be pushed closer to the forward sheave 42. As indicated above, moving the two sheaves together pushes their conical surfaces 41 and 43 against the V-shaped belt 24 pushing it radially outward to thereby change the pulley ratio.

In order for the actuation screw 154 to accomplish its appointed function, the split nut 158 must be held axially stationary relative to the rear sheave 40. Thus, the split nut 158 is mounted within a split nut holder 159. A retainer 160 is internally threaded into the split nut holder 159 to trap the split nut 158 between the holder and the retainer. The split nut holder 159 is itself threaded into a support shaft 164 at a threaded engagement 165. The support shaft 164 is mounted to the base plate 38, and is therefore stationary with respect to the ratio adjustment mechanism 46.

Figure 18:
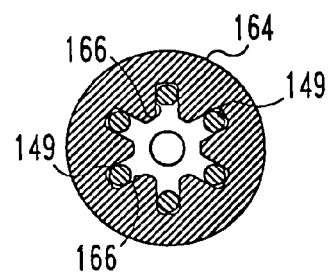
FIG. 18 is an end cross-sectional view of a support shaft used in the driven member assembly shown in FIG. 14.

Referring to FIG. 18, it can be seen that the interior of the support shaft 164 is configured into an array of pin channels 166. These pin channels are aligned with each of the force pins 149 and with the spokes 153 of the pressure plate 152. In this way, the pressure plate 152 is prevented from rotating, its movement being limited to axial displacement along the pin channels 166 of the support shaft 164.

Figure 15:
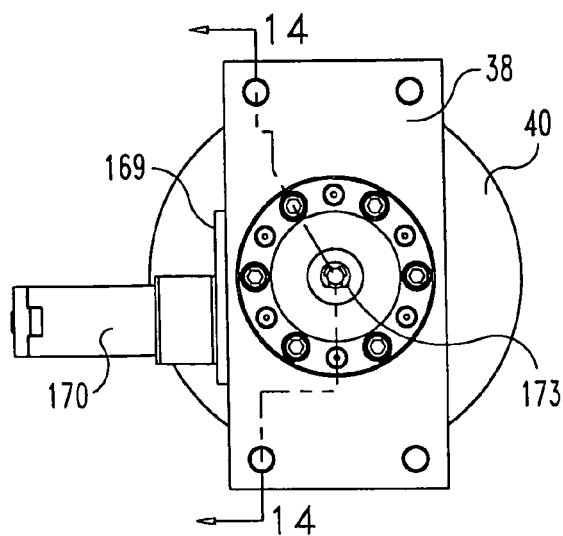
FIG. 15 is an end elevational view of the driven member assembly shown in FIG. 14.

As expressed above, the ratio adjustment mechanism 46 is driven by a motor. In the illustrated embodiment, a motor 170 is mounted on the mounting plate 38 by a mounting bracket 169 (FIG. 15). The motor is preferably an electric motor driven by the vehicle electrical system. In a most preferred embodiment, the motor 170 is driven by signals from an engine control module that monitors the engine operation and performance. Specifically, the engine control module can make determinations as to when the transfer drive assembly ratio must be changed and to what extent. Consequently, the motor 170 must be capable of intermittent action and incremental motion. Preferably, the motor 170 is a gear motor driven by a PWM controller, although other motors, such as a stepping motor, can be used. In one specific embodiment, the motor is a model IM-15 motor provided by Globe Motors Co.

The motor 170 drives a worm 171 which mates with a worm gear 172. In the illustrated embodiment, the motor is oriented transverse or perpendicular to the axis B of the driven member assembly 22. Thus, the worm and worm gear combination transmits the rotary power of the motor to rotational movement of the worm gear 172. It is understood, however, that other motor and gearing combinations are contemplated by the present invention. For instance, a rack and pinion arrangement can be utilized to translate power from a linear motor to rotational movement.

The worm gear 172 is mounted to a worm gear shaft 173. The worm gear shaft 173 passes through a hollow end of the actuation screw 154. The worm gear shaft 173 is supported at an opposite end by a thrust bushing 174 mounted within the mounting base plate 38.

The actuation screw 154 defines a pair of opposite engagement slots 175. A dowel pin 176 passes through the worm gear shaft 173 and is oriented within the engagement slots 175. In this manner, the worm gear shaft 173 can transmit rotational movement to the actuation screw 154 by way of the dowel pin 176. At the same time, the actuation screw 154 is free to slide axially along the axis B with the dowel pin 176 sliding along the engagement slots 175. It can therefore be appreciated that rotation of the worm gear shaft 173 under power from the motor 170 causes direct rotation of the actuation screw 154.

When the motor 170 directs rotation of the worm gear shaft 173 in one direction, the actuation screw 154 is threaded deeper into split nut 158. As the actuation screw 154 is threaded into the nut it advances toward the rear sheave 40, pushing the rear sheave as described above. In the alternative, rotation of the motor 170 in the opposite direction causes the actuation screw 154 to unthread from the split nut 158. As the actuation screw 154 is retracted, the bearing pressure plate 148 moves away from the bearing 142 supporting the rear sheave 40. The tension within the rotating drive belt 142 causes the belt to project deeper into the gap between the rear and forward sheaves, thereby pushing the rear sheave 40 back toward the pressure plate 152. Thus, the bearing pressure plate 148 is always substantially in contact with the needle/thrust bearing 142 of the rear sheave 40.

The driven member assembly 22 further includes a fail-safe feature that accounts for a loss of electrical power to the ratio adjustment mechanism 46. In the preferred embodiment, this mechanism 48 includes a solenoid 180 mounted to the free end of the support shaft 164. More specifically, the solenoid 180 is supported by a mounting bracket 182 on the split nut holder 159. A number of control wires 181 electrically connect the solenoid 180 to an external electrical source. Since the support shaft 164 is stationary, the control wires can pass along a channel defined in the shaft, exiting adjacent the mounting base plate 38. The solenoid 180 is preferably electrically connected to the vehicle electrical system, and most preferably to the engine control module. Thus, when power is interrupted to the adjustment mechanism motor 170, power is also interrupted to the solenoid 180. In one specific embodiment, the solenoid 180 can be a low profile push-pull solenoid, such as a model 129415-023 solenoid provided by Lucas Ledex Co.

The solenoid 180 includes a solenoid shaft 183 that is held in its actuated position as long as power is provided to the solenoid 180. The solenoid shaft 183 is threadedly engaged to an engagement finger holder 185. This finger holder supports a number of engagement fingers 186 that project toward the split nut 158. More particularly, the engage fingers 186 contact a control ramp surface 161 of the split nut 158.

Figure 19:
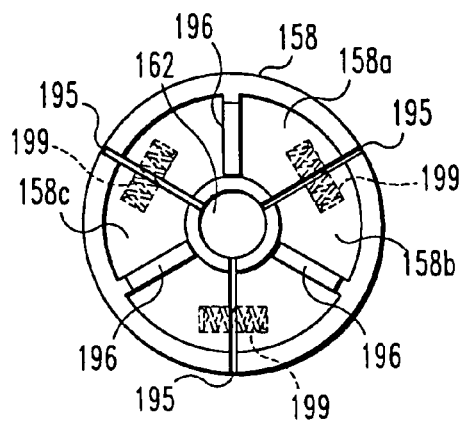
FIG. 19 is an end elevational view of a split nut used with the driven member assembly shown in FIG. 14.
Figure 20:
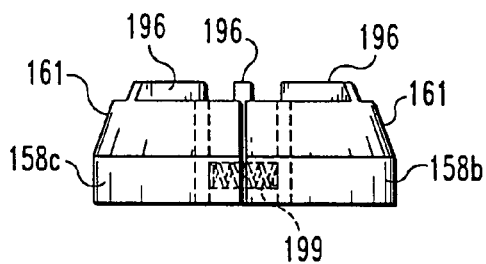
FIG. 20 is a side elevational view of the split nut shown in FIG. 19.

Operation of the engagement fingers is best understood following an explanation of the structure of the split nut 158, with specific reference to FIGS. 19 and 20. The split nut 158 includes a number of separable components 158a–158c. When the components are combined, they define the internal screw threads 162 that are engaged by the threaded portion 156 of the actuation screw 154. However, when the components of the split nut are separated, the internal screw threads 162 are interrupted and the threaded portion 156 of the actuation screw 154 has no screw threads to engage. The component 158a–158c are separated by a split gap 195. Preferably, this gap is zero when the components of the split nut are combined. On the other hand, when the split nut is separated, this gap 159 is large enough so that the internal threads of the split nut cannot contact the threaded portion 156 of the actuation screw 154.

Figure 21:
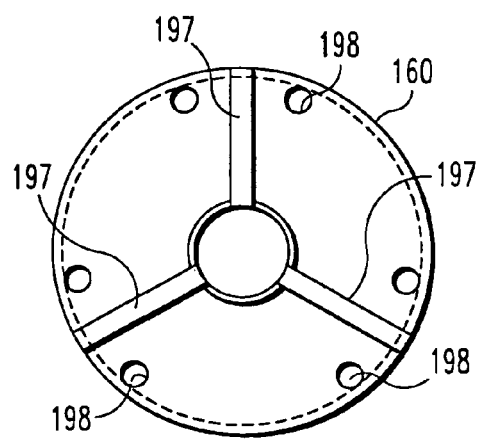
FIG. 21 is an end elevational view of a retainer for the split nut for use in the driven member assembly shown in FIG. 14.

In order to maintain the integrity of the split nut 158 and insure repeatable separation and combination of its components 158a–158c, the split nut includes a number of guide tabs 196 projecting therefrom. These guide tabs are aligned to slide within corresponding guide slots 197 defined in the retainer 160 (see FIG. 21). The retainer 160 also includes a number of finger bores 198 aligned with the engagement finger holder 185 to receive the engagement fingers 186 therethrough.

With this background on the split nut 157, the operation of the engagement fingers 186 can be more readily understood. As the engagement fingers 186 are pushed rearward, i.e. toward the split nut 158, the fingers contact the control ramps 161 of each of the split nut components 158a–158c. As the fingers 186 move along the ramp, they continue until they reach the outer diameter of the split nut 158. At this point, the split gaps 195 are essentially closed and the internal screw threads 162 of the split nut are defined.

On the other hand, with the engagement fingers 186 are retracted, they move away from the control ramps 161. Once the fingers have cleared the ramps and are no longer in contact with the split nut, the components 158a–158c are free to separate. The overall integrity of the split nut 158 is maintained by the tabs 196 sliding along the slots 197. The separation of the split nut components 158a–158c can be accomplished by separation springs 199 mounted within the split nut. The separation springs can be compression springs or leaf springs supported within each component to span the split gaps 195.

During normal operation, the solenoid 180 is powered and the solenoid shaft 183 is maintained in its actuated position. However, when power is removed from the solenoid, the shaft 183 is pushed away from the retainer 160 by operation of a return spring 187. As shown in FIG. 14, the return spring is contained within the engagement finger holder 185 and the retainer 160. Thus, the return spring 187 in essence pushes the engagement fingers 186 away from the split nut 158, allowing its components to separate.

When the split nut 158 is separated, the threaded portion 156 of the actuation screw 154 no longer has a threaded reaction surface to operate against. In this event, the fail-safe mechanism 48 provides means for pushing the rear sheave 40 forward to the forward sheave 42, thereby increasing the pulley ratio. This action is accomplished by a return spring 190 disposed within the support shaft 164. The return spring 190 is situated between a spring carrier 191 at one end and a reaction flange 192 internally formed within the support shaft 164. The spring carrier 191 is retained relative to the actuation screw 154 by way of a carrier nut 193. The large return spring 190 can exert force on the spring carrier 191 through a thrust bearing 194 that can be provided to reduce rotational drag on the actuation screw.

The fail-safe mechanism 48 of the present invention is operable to return the driven member assembly to a predetermined pulley ratio. For the purposes of explanation, the illustrated embodiment provides a fail-safe ratio of 1:1. When the split nut components 158a–158c are separated, the response of the fail-safe components depends upon the current pulley ratio. For a ratio greater than the predetermined value (1:1 in the present example), the mechanism 48 drives the rear sheave 40 forward. For ratios less than the predetermined value, the mechanism allows the belt tension to separate the two sheaves.

Looking first at a pulley ratio greater than the specific 1:1 value, the rear sheave 40 is separated from the forward sheave 42. When the split nut components 158a–158c separate, the threaded portion 156 of the actuation screw is free to slide axially forward along the axis B. The large return spring 190 pushes the spring carrier 191 forward, which contacts the carrier nut 193 to further push the actuation screw 154 forward. As the actuation screw 154 is pushed forward, the enlarged head 155 contacts the pressure plate 152, causing the force pins 149 to bear against the bearing pressure plate 148. The bearing pressure plate 148 pushes against the rear sheave 40 until the spring carrier 191 reaches its limit of movement, at which point the rear sheave is immediately adjacent the forward sheave 42. In a specific embodiment, the two sheaves are separated by a gap of about 0.5 inches at their closest point.

The large return spring 190 is calibrated to provide sufficient force to act against the operating tension in the belt 24. Moreover, the forward movement of the rear sheave is limited by the movement of the spring carrier 191 as the large spring 190 extends. Specifically, in the preferred embodiment, the spring carrier butts against the split nut holder 159 to limit its axial movement. The position of the rear sheave 40 is thus fixed once the carrier contacts the nut holder, which thereby establishes the predetermined pulley ratio.

When the pulley ratio is less than the predetermined value (1:1), the spring carrier 191 is already in contact with the nut holder 159, the threaded portion 156 of the actuation screw 154 extends deeply into the nut holder, and the carrier nut 193 is disposed apart from the spring carrier. When the split nut components 158a–158c separate, the threaded portion 156 is released and the actuation screw 154 is freely to move axially rearward. The belt tension is then free to push the rear sheave 40 away from the forward sheave 42. As the rear sheave moves back, the bearing pressure plate 148 pushes against the force pins 149, which push against the pressure plate 152, and ultimately against the enlarged head 155 of the actuation screw. As the actuation screw 154 is pushed rearward, the carrier nut 193 moves into contact with the spring carrier 191 which further compresses the large spring 190. This restorative movement continues until the force generated by the large spring 190 matches the force created by the belt tension. At this point, the driven pulley is at the predetermined ratio.

Figure 22:
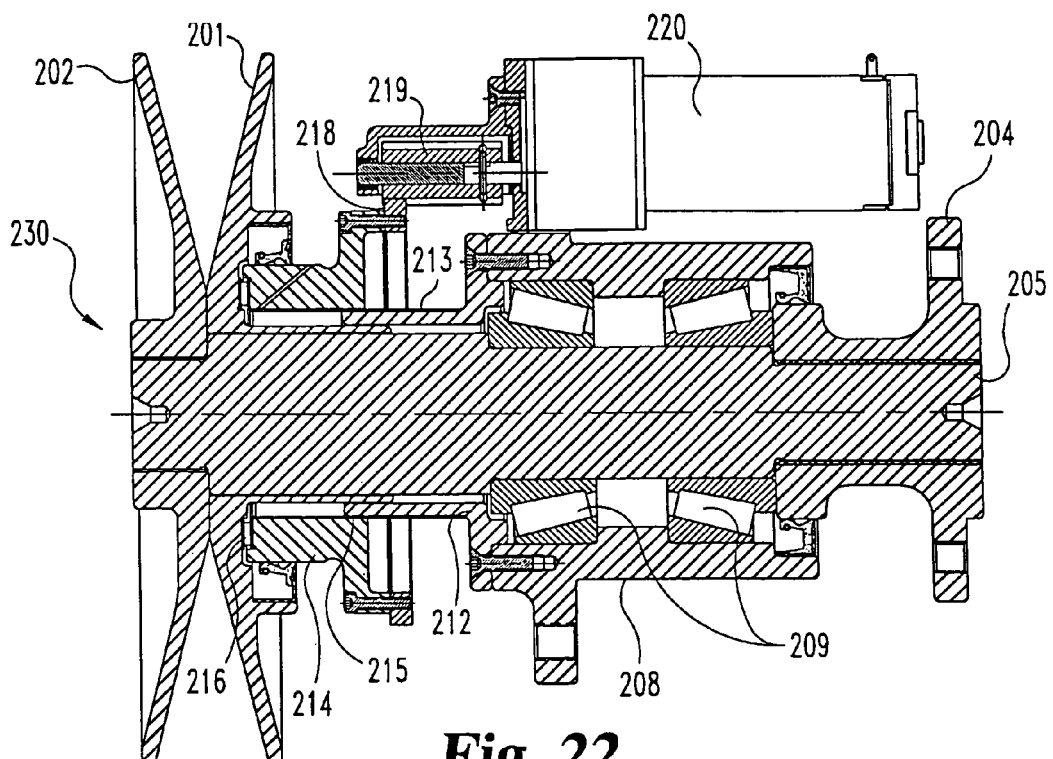
FIG. 22 is a side partial cross-sectional view of an alternative embodiment of a driven member assembly for use with a transfer drive assembly as shown in FIG. 2.

The driven member assembly 22 is indicative of one embodiment of the transfer drive assembly according to the present invention. An additional embodiment is illustrated in FIG. 22. Specifically, a driven member assembly 200 includes a rear sheave 201 and forward sheave 202. In this instance, the fan mounting flange 204 is engaged at one end of a driven shaft 205. The froward sheave 202 is mounted at the opposite end of the driven shaft 205. The driven shaft 205 is rotatably supported by a bearing housing 208 by way of a pair of tapered roller bearings 209. This bearing housing 208 can be mounted to the vehicle or engine.

A screw flange 212 is mounted to the bearing housing 208. The flange 212 defines external screw threads that mate with corresponding threads 215 on a thrust collar 214. The thrust collar applies force against the forward sheave 201 through a needle bearing 216.

The ratio adjustment mechanism includes a motor 220 that is arranged parallel to the axis of the driven shaft 205. This configuration for the motor allows the driven member assembly 200 to be mounted within a vehicle having particular space requirements. The motor 220 drives a pinion gear 219 which engages a spur gear 218. A spur gear 218 is attached to the thrust collar 214. Thus, rotation of the pinion gear 219 by the motor 220 is translated to rotation of the spur gear 218. As the spur gear rotates, so does the thrust collar 214. Rotation of the thrust collar 214 causes its internal threads 215 to advance or retract along the external threads 213 of the screw flange 212. In this way, the position of the rear sheave 201 relative to the forward sheave 202 can be modified to adjust the pulley drive ratio.

Figure 23:
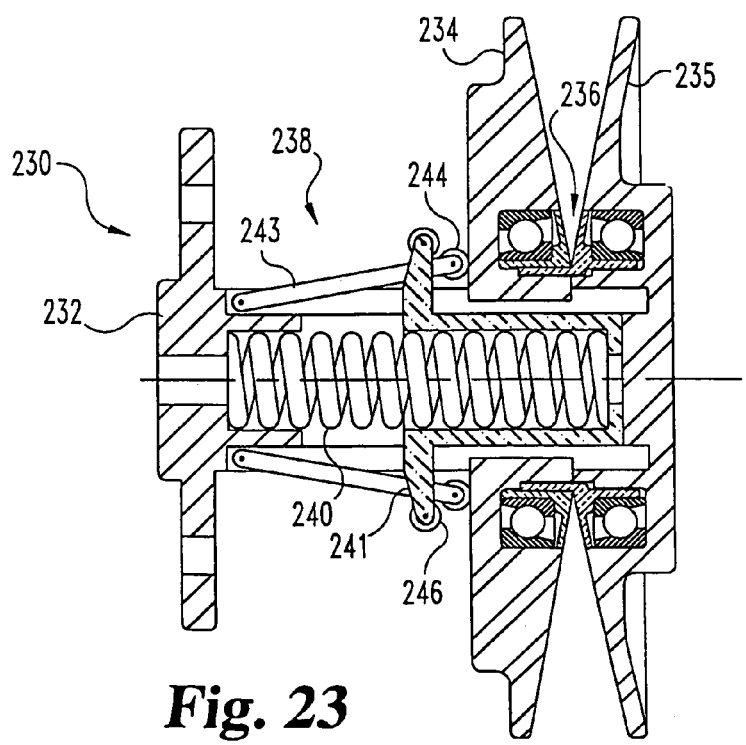
FIG. 23 is a side cross-sectional view of a further alternative embodiment of a driving member assembly for use in the transfer drive assembly depicted in FIG. 2.

In an alternative embodiment of the driving member assembly, an assembly 230 shown in FIG. 23 includes a driving shaft 232. The assembly includes a rear sheave 234 and a forward sheave 235. A disengagement mechanism 236 can be disposed between the two sheaves, as with prior embodiments.

The driving member assembly 230 provides a different tensioning mechanism 238 than with the prior embodiments. In particular, the mechanism 238 includes a compression spring 240 that reacts between the driving shaft 232 and a spring cup 241. A force transfer lever 243 is pivotally mounted at one end to the driving shaft 232. A transfer roller 244 is provided at the opposite end of the transfer lever 243. The spring cup 241 includes opposite rollers 246 that rotate along the transfer lever 243.

In operation of this embodiment of the driving member assembly 230, as the rear sheave 234 moves rearward, it exerts pressure against the transfer roller 244. This pressure cause the transfer lever 243 to pivot radially outward relative to the driving shaft 232. As the transfer lever pivots outward, the rollers 246 of the spring cup roll along the lever, causing the spring cup 241 to be displaced axially and rearwardly. As the spring cup moves rearwardly, the compression spring 240 increases its resistant force until equilibrium is established. When viewed in a different sense, the compression spring 240 transfers a tensioning force through the spring cup 241 to the transfer levers 243, through the rollers 244 and against the rear sheave 234 to push it toward the forward sheave 235.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected. For example, in the depicted embodiments, the rear sheave of the drive assembly is movable with respect to the relatively stationary forward sheave. This arrangement can be reversed with appropriate modification to the inventive elements of the system.

For instance, in some embodiments, the weight arm assembly, such as assembly 100, can be mounted differently. In one modification, the weight arms 101 can be pivotably mounted to the rear sheave 40 itself, rather than to the floating sleeve.

In alternative embodiments, certain of the features described above can be eliminated. For instance, the disengagement mechanism, such as mechanism 65, need not be incorporated into all variable ratio transfer drive assembly designs. Likewise, a transfer drive assembly can incorporate several of the aforementioned inventive features, while eliminating the weight arm assembly and/or other components of the tensioning mechanism, such as mechanism 32. Moreover, other tensioning systems can be substituted for certain specific embodiments.

What is claimed is:

1. A variable ratio drive system (15) connectable between a source of rotary motion and a driven device, said system comprising:
a driving member (20) having a rotating shaft (55) connectable to said source of rotary motion for rotation about a drive axis (A);
a driven member (22) connectable to said driven device; and
a belt (24) connected between said driving member (20) and said driven member (22) and operable to transmit rotary motion therebetween;
wherein said driving member (20) includes;
a first sheave (30) and a second sheave (28), each having a conical surface (31, 29) configured for frictional engagement with the belt (24);
means (57, 60) for connecting said first sheave (30) to said rotating shaft (55) for rotation therewith;

means for connecting said second sheave (28) to said rotating shaft (55) for rotation therewith while permitting translation relative thereto along said drive axis (A);

a weight arm assembly (100) pivotally mounted to said rotating shaft (55) to pivot centrifugally outward relative to said drive axis (A);

at least one force transmitting member disposed between said weight arm assembly (100) and said second sheave (28) to apply force to said second sheave (28) as a function of the centrifugally outward pivoting of said weight arm assembly (100);

at least one spring (80) disposed between said rotating shaft (55) and said second sheave (28) to apply force to said second sheave (28) so as to help maintain tension in said belt (24); and a lever system pivotally mounted between said rotating shaft (55) and said second sheave (28) to apply force to said second sheave (28) so as to also help maintain tension in said belt (24).

2. The variable ratio drive system according to claim 1, wherein at least one said force transmitting member includes a roller (107) mounted on said second sheave (28) and arranged to contact said weight arm assembly (100) as said assembly (100) pivots centrifugally outward.

3. The variable ratio drive system according to claim 2, wherein said weight arm assembly (100) includes:

at least one arm (101) pivotably mounted at a first end (102); and a weight (104) attached to each said arm (101) at an opposite second end.

4. The variable ratio drive belt system according to claim 3, wherein at least one said arm (133) includes a substantially S-shaped portion (134) between said first and second ends that contacts at least one said roller (135), and said S-shaped portion includes both a concave cam-edge and a convex cam-edge.

5. A pulley apparatus for a belt drive system (15), said pulley apparatus comprising:

a first sheave (30) defining a first conical surface (31);

a second sheave (28) defining a second conical surface (29) opposite said first conical surface (31) for engaging a belt (24) therebetween;

a shaft (55) engaged to at least one of said first sheave (30) and said second sheave (28) for rotation therewith;

an idler element (65) disposed between said first sheave (30) and said second sheave (28) and defining two conical surfaces (67, 70) situated opposite each other, said two conical surfaces (67, 70) having respective surface areas that are substantial commensurate with each other, and said two conical surfaces (67, 70) being substantially aligned with said first and second conical surfaces (31, 29) and configured for engaging a belt (24) therebetween; and means for supporting (68, 71) said idler element (65) relative to said first and second sheaves (30, 28) to isolate said idler element (65) from rotation with said first and second sheaves (30, 28).

6. The pulley apparatus according to claim 5, wherein said means for supporting (68, 71) said idler element (65) includes a thrust roller bearing.

7. The pulley apparatus according to claim 5, wherein:

said second sheave (28) is movable along an axis (A) of said shaft (55) relative to said first sheave (30); and said idler element (65) includes a first idler component (66) mounted within said first sheave (30) and a second idler component (69) mounted within said second sheave (28), one of said first and second idler components (66, 69) defining a hub (72) arranged to span the distance between said first sheave (30) and said second sheave (28) when said sheaves (30, 28) move apart.

8. The pulley apparatus according to claim 5, wherein the sidewall heights of said two conical surfaces (67, 70) defined by said idler element (65) are respectively greater than the sidewall thickness of said belt (24).

* * * * *

UNITED STATES PATENT AND TRADEMARK OFFICE
CERTIFICATE OF CORRECTION

PATENT NO. : 7,217,204 B2
APPLICATION NO. : 11/220212
DATED : May 15, 2007
INVENTOR(S) : Joshua L. Roby It is certified that error appears in the above-identified patent and that said Letters Patent is hereby corrected as shown below:

Column 20, Line 11: "substantial" should read -- substantially --

Signed and Sealed this
Twenty-eighth Day of February, 2012

David J. Kappos
*Director of the United States Patent and Trademark Office*